(12) United States Patent
Qin

(10) Patent No.: US 10,449,607 B2
(45) Date of Patent: Oct. 22, 2019

(54) HYDROGEN REDUCTION OF METAL SULPHATE SOLUTIONS FOR DECREASED SILICON IN METAL POWDER

(71) Applicant: Sherritt International Corporation, Fort Saskatchewan (CA)

(72) Inventor: Fu Qin, Sherwood Park (CA)

(73) Assignee: Sherritt International Corporation, Fort Saskatchewan (CA)

( * ) Notice: Subject to any disclaimer, the term of this patent is extended or adjusted under 35 U.S.C. 154(b) by 372 days.

(21) Appl. No.: 15/293,980

(22) Filed: Oct. 14, 2016

(65) Prior Publication Data
US 2017/0106450 A1    Apr. 20, 2017

Related U.S. Application Data

(60) Provisional application No. 62/242,184, filed on Oct. 15, 2015.

(51) Int. Cl.
*B22F 9/26* (2006.01)
*B22F 9/24* (2006.01)
(Continued)

(52) U.S. Cl.
CPC ........... *B22F 9/24* (2013.01); *B22F 9/26* (2013.01); *C01G 3/02* (2013.01); *C01G 3/10* (2013.01);
(Continued)

(58) Field of Classification Search
None
See application file for complete search history.

(56) References Cited

U.S. PATENT DOCUMENTS 1,686,391 A    10/1928    Muller et al.
2,694,005 A    11/1954    Schaufelberger
(Continued)

FOREIGN PATENT DOCUMENTS

AU    2011236124    5/2012
CN    105271632     1/2016
(Continued)

OTHER PUBLICATIONS

International Search Report with Written Opinion corresponding to International corresponding to International Patent Application No. PCT/CA2016/000261, dated Feb. 1, 2017.
(Continued)

*Primary Examiner* — George Wyszomierski
(74) *Attorney, Agent, or Firm* — Leydig, Voit & Mayer, Ltd.

(57) ABSTRACT

Process to decrease silicon content of metal powder produced by hydrogen reduction from ammoniacal ammonium sulphate solutions containing metal ammine complexes, wherein metal (Me) is Ni, Co, or Cu. The process controls the precipitation of metal hydroxide, which is found to be an effective scavenger for silicon. Silicon is preferentially removed from metal diammine sulphate-containing solutions by precipitating with a small amount of a metal hydroxide, and then separating the silicon-bearing metal hydroxide precipitate from the solution. This solution, from which the silicon impurity has been removed with the metal hydroxide precipitate, can then be reduced in one or more densification cycles with a reducing gas to produce an elemental metal powder having a decreased silicon content. Alternatively, the solution is reduced to produce a low silicon metal powder seed material for the first of the one or more densification cycles.

39 Claims, 7 Drawing Sheets

(51) Int. Cl.
*C01G 3/10* (2006.01)
*C01G 51/10* (2006.01)
*C01G 53/10* (2006.01)
*C01G 51/04* (2006.01)
*C01G 53/04* (2006.01)
*C01G 3/02* (2006.01)
*C22B 3/00* (2006.01)

(52) U.S. Cl.
CPC ............ *C01G 51/04* (2013.01); *C01G 51/10* (2013.01); *C01G 53/04* (2013.01); *C01G 53/10* (2013.01); *C22B 23/0461* (2013.01); *B22F 2009/245* (2013.01); *B22F 2201/013* (2013.01); *B22F 2301/10* (2013.01); *B22F 2301/15* (2013.01); *B22F 2998/10* (2013.01); *B22F 2999/00* (2013.01)

(56) References Cited

U.S. PATENT DOCUMENTS

| | | |
|---|---|---|
| 2,726,934 A | 12/1955 | Forward et al. |
| 2,733,990 A | 2/1956 | Van Hare et al. |
| 2,734,821 A | 2/1956 | Schaufelberger |
| 2,753,257 A | 7/1956 | Nashner et al. |
| 2,767,083 A | 10/1956 | MacKiw et al. |
| 2,836,485 A | 5/1958 | Schaufelberger et al. |
| 2,853,374 A | 9/1958 | Schaufelberger |
| 3,734,721 A | 5/1973 | Seibt et al. |
| 3,761,250 A | 9/1973 | Weir et al. |
| 3,816,098 A | 6/1974 | MacKiw et al. |
| 3,833,351 A | 9/1974 | Neskora et al. |
| 4,148,632 A | 4/1979 | Seibt et al. |
| 4,149,875 A | 4/1979 | Crnojevich et al. |
| 5,246,481 A * | 9/1993 | Scheie ................ C22B 23/0461 75/374 |
| 7,357,827 B2 | 4/2008 | Roche et al. |
| 7,387,767 B2 | 6/2008 | Campbell et al. |
| 2017/0008083 A1* | 1/2017 | Yanagisawa ............. B22F 3/10 |

FOREIGN PATENT DOCUMENTS

| | | | |
|---|---|---|---|
| GB | 722373 | * | 1/1955 |
| GB | 751866 | | 7/1956 |
| GB | 824470 | | 12/1959 |

OTHER PUBLICATIONS

International Preliminary Report on Patentability, dated Apr. 17, 2018, corresponding to International Application No. PCT/CA2016/000261 (filed Oct. 13, 2016), parent of the present application, 7 pp.

Agrawal et al. (2006) "A comprehensive review on the hydro metallurgical process for the production of nickel and copper powders by hydrogen reduction," Materials Research Bulletin 41(4): 879-892.

European Supplemental Search Report, dated Jun. 25, 2019, corresponding to European Application No. 16854674.5 corresponding to the present application, 10 pp.

* cited by examiner

HYDROGEN REDUCTION OF METAL SULPHATE SOLUTIONS FOR DECREASED SILICON IN METAL POWDER

CROSS REFERENCE TO RELATED APPLICATIONS

This application claims priority from U.S. Provisional Patent Application No. 62/242,184, filed Oct. 15, 2015, which is incorporated by reference herein to the extent that there is no inconsistency with the present disclosure.

BACKGROUND

In many hydrometallurgical processes, the established reduction step for producing metallic nickel powder involves a nickel sulphate feed solution, typically an aqueous feed solution, to which ammonium sulphate (Amsul) is added and which is adjusted with ammonia to produce a nickel diammine sulphate solution. In general, in industrial practice, the ammonia adjustment is sufficient to allow for the quantitative formation of the nickel diammine complex in solution, and the ammonium sulphate addition is sufficient to stabilize the nickel diammine complex to minimize the precipitation of nickel as the hydroxide. The thus stabilized nickel diammine sulphate solution, i.e., adjusted in composition so as to minimize the risk of precipitate formation, is then contacted with hydrogen at elevated temperature and pressure in an autoclave to reduce the nickel from solution in the form of an elemental nickel powder. The reduction process typically includes two steps. The first step is a nucleation step in which an initial reduction of nickel produces finely-divided material termed a seed material. This seed material is used in the first of a following series of densification cycles, wherein the nickel powder in the vessel is allowed to settle, the essentially nickel-free reduction end solution (RES) is discharged from the vessel, fresh nickel diammine sulphate solution is introduced to the vessel, and reduction with hydrogen is repeated through multiple densification cycles. In each densification cycle, additional nickel is reduced onto the previously formed metallic nickel particles, causing such particles to grow in size, until the target size distribution of the nickel powder product is obtained.

Exemplary patents having teachings directed to reducing nickel from solution to produce nickel powder products, or to nickel reduction with nucleation and densification cycles include U.S. Pat. Nos. 2,734,821; 2,767,083; 2,853,374; and 3,816,098.

The above-mentioned nickel sulphate solution may be prepared in a number of ways, or result from a number of processes, before its adjustment in terms of ammonia and ammonium sulphate additions. For example, in the recovery of nickel metal from laterite ore, a High Pressure Acid Leach (HPAL) process may be used to prepare a nickel sulphate solution, as practised on an industrial scale by Ambatovy in Madagascar, amongst others. In this process, nickel and cobalt in laterite ore, containing about 1 wt % Ni, 0.1 wt % Co and 1 to 3 wt % silicon, are extracted into solution in a high pressure acid leach step. Following partial neutralization of the solution with limestone, a nickel-cobalt mixed sulphide intermediate material may be produced by precipitation of the nickel and cobalt from the partially neutralized solution as their sulphides, by addition of hydrogen sulphide gas. The mixed sulphide intermediate is then leached in the presence of oxygen, the resulting nickel-cobalt solution is purified by iron and copper removal, and solvent extraction then separates cobalt from nickel. The purified nickel sulphate solution from solvent extraction is then adjusted, as described above, by ammonia and ammonium sulphate (Amsul) addition to form a stabilized nickel diammine solution. Nickel powder is then produced by hydrogen reduction of the diammine solution, as set out above.

During this HPAL process, a small fraction of the silicon that is initially leached from the laterite ore in the high pressure acid leach step reports to the mixed sulphide intermediate. A portion of the silicon in the mixed sulphide intermediate is extracted in the oxidizing leach and only a small fraction of this is removed in the iron and copper removal steps. Hence, a portion of the silicon may be carried over into the diammine solution after purification and solvent extraction and is precipitated as an undesired impurity with the nickel powder, lowering the commercial value of the product. The quantity of silicon precipitated to the nickel powder is roughly proportional to the silicon concentration in the solution generated by the oxidizing leach of the sulphide intermediate. Typically, plants using this process do not have a controlled method of removing silicon from this solution. As a result, if the silicon concentration present in the mixed sulphide intermediate is high, the silicon concentration in the corresponding nickel powder will be high. As an example, nickel powder produced by this process during the early months of operation of the Ambatovy refinery frequently contained in excess of 0.02 wt % silicon, which, although significantly lower than the relative content of silicon to nickel in the original ore, is significantly higher than the production specification for nickel powder that was targeted (<0.005 wt % Si).

In order to achieve low silicon levels in the nickel powder product, care must be taken to minimize the transfer of silicon to the HPAL leach solution, from the HPAL leach solution to the sulphide intermediate, from the sulphide intermediate to the oxidative leach solution, and so on. U.S. Pat. No. 7,387,767 discloses an HPAL process for laterite ore, including efforts to decrease silicon and other impurities in the mixed sulphide intermediate.

Control of the silicon content of the final nickel powder product requires control of silicon precipitation behaviour in both the nucleation and the densification steps, neither of which is well understood in the prior art processes.

U.S. Pat. No. 4,149,875 discloses a process to purify nickel or cobalt metal powders containing high amounts of silicon impurities using a sodium hydroxide wash at elevated temperatures. While post-washing of the metal powders in this manner has not generally been found to be a satisfactory solution to the problem, this patent discusses the difficulties faced in the hydrometallurgical industry in controlling the level of silicon impurities in the nickel and/or cobalt powder end product.

SUMMARY

The process described herein is directed to decreasing the silicon content of metal powder produced by hydrogen reduction from ammoniacal ammonium sulphate solutions containing metal ammine complexes. The metal (Me) is one of Ni, Co, or Cu. The process is based on control of the precipitation of metal hydroxide, which is found to be an effective scavenger for silicon. As such, in some exemplary embodiments, silicon is preferentially removed from metal diammine sulphate-containing solutions by precipitating with a small amount of a metal hydroxide, and then separating the silicon-bearing metal hydroxide precipitate from the solution. This solution, from which the silicon impurity has been removed with the metal hydroxide precipitate, can then be reduced in one or more densification cycles with a reducing gas to produce an elemental metal powder having a decreased silicon content. Alternatively, the solution is reduced to produce a low silicon metal powder seed material for the first of the one or more densification cycles.

In other embodiments, practised separately or in concert with the above-mentioned embodiments, metal hydroxide formation is prevented in the subsequent metal powder densification cycles, by controlling the stability of the densification feed solution to prevent or lessen the silicon impurity from precipitating from the metal diammine sulphate solution and reporting to the metal powder product. This control of the stability of the densification feed solution includes:

a) pretreating the metal sulphate feed solution with ammonium sulphate and ammonia with mixing to form an ammoniacal ammonium sulphate solution in which the molar ratio of $NH_3$:Me is at least the stoichiometric value to form stabilized metal ammine complexes of the formula $Ni(NH_3)x$, wherein x is at least 2, and preferably greater than 2.2; and then b) adding the metal sulphate feed solution to the ammoniacal ammonium sulphate solution of step a) with mixing without allowing the molar ratio of $NH_3$:Me to drop below about 1.8, and preferably not below about 2.

In some embodiments, the ammonia to metal ($NH_3$:Me) molar ratio (MR) in step a) is controlled above about 2, such as between about 2.2 and 3.

The inventor has thus demonstrated a previously unknown connection between metal hydroxide formation and silicon precipitation (the co-precipitation of silicon with metal hydroxide) to control the deportment of silicon between solution and solids in the metal reduction process, and hence the silicon content of the metal powder product.

The process is demonstrated in various embodiments with nickel sulphate solutions, however, it will be evident to those skilled in the art that the process of removing silicon from solution, or stabilising silicon in solution such that silicon does not interfere with the subsequent reduction of the nickel metal, has more general application in the preparation of ammoniacal ammonium sulphate solutions for the reduction of a metal therefrom, on the basis of well-known metal ammine chemistry, and in particular to the chemistry of nickel, cobalt and copper.

In some embodiments, the process thus permits producing on-spec nickel powder, that is, a nickel powder with less than 0.005 wt % Si, from nickel sulphate solution in a hydrogen reduction process at elevated temperature and pressure, despite fluctuations in the silicon content of the nickel sulphate solution used as densification feed to the hydrogen reduction circuit.

The inventor has demonstrated that a high silicon content in nickel powder is associated with nickel hydroxide formation both during a nucleation step to prepare seed material, and during the nickel diammine solution (densification feed solution) preparation step. Thus, decreasing the silicon content of nickel powder is based on the control of the precipitation of nickel hydroxide ($Ni(OH)_2$) from the nickel sulphate feed solution, in one or both of the nucleation step and the densification step, i.e., the solution adjustment before hydrogen reduction.

In one broad aspect, there is provided a process of treating a metal sulphate solution containing an undesired silicon impurity, wherein the metal is one of Ni, Co, or Cu. The process includes:

i) providing metal hydroxide solids in the metal sulphate feed solution to scavenge the undesired silicon impurity with the metal hydroxide solids; and then, in either order;

ii) adding ammonia, ammonium sulphate or the metal sulphate feed solution as needed in one or more steps with mixing to form an ammoniacal ammonium sulphate solution containing stabilized metal ammine complexes; and iii) separating the metal hydroxide solids to remove the silicon impurity with the metal hydroxide solids.

In some embodiments, the above process is followed by:

iv) after steps ii) and iii) in either order, reacting the solution resulting from step ii) or iii) with a reducing gas at elevated temperature and pressure to produce a finely divided seed material of elemental metal powder; and/or v) after steps ii) and iii) in either order, reacting the solution resulting from step ii) or iii) with a reducing gas at elevated temperature and pressure in one or more densification cycles, optionally in the presence of the metal powder seed material from step iv), to produce an elemental metal powder product and a reduction end solution; and vi) separating the metal powder product from the reduction end solution.

In another broad aspect, there is provided a process for recovering metal powder from a metal sulphate feed solution containing undesirable silicon impurity, wherein the metal (Me) is one of Ni, Co or Cu. The process includes:

a) pretreating the metal sulphate feed solution with ammonium sulphate and ammonia with mixing to form an ammoniacal ammonium sulphate solution in which a molar ratio of $NH_3$:Me is at least the stoichiometric value to provide stabilized metal ammine complexes of the formula $Me(NH_3)x$, wherein x is at least 2;

b) adding the metal sulphate feed solution to the ammoniacal ammonium sulphate solution of step a) with mixing without allowing the molar ratio of $NH_3$:Me to drop below about 1.8;

c) reacting the adjusted solution of step b) with a reducing gas at elevated temperature and pressure in one or more densification cycles to produce an elemental metal powder product and a reduction end solution containing the undesired silicon impurity; and d) separating the metal powder product from the reduction end solution.

In some embodiments, the above process is practised with a process to prepare a seed material for step c), including:

i) adding ammonia to the metal sulphate feed solution with mixing in an amount sufficient to precipitate metal hydroxide solids to scavenge the undesired silicon impurity from the metal sulphate feed solution; and then, in either order, ii) adding ammonium sulphate as needed to provide an ammoniacal ammonium sulphate solution containing stabilized metal ammine complexes of the formula $Me(NH_3)x$, where x is at least 2; and iii) separating the metal hydroxide solids to remove the silicon impurity with the metal hydroxide solids; and iv) after step ii) and iii) in either order, reacting the solution resulting from step ii) or iii) with a reducing gas at elevated temperature and pressure to produce a finely divided seed material of elemental metal powder onto which the elemental metal powder product is formed in the one or more densification cycles of step c).

Definitions:

The following terms as used herein and in the claims have the following meanings.

The term "ammoniacal solution" refers to a solution in which "free" ammonia remains in the solution, wherein "free" ammonia is defined as "acid titratable" ammonia. Acid titratable ammonia can be shown to exist, for example when titrated with 2.94 N $H_2SO_4$, using Congo Red as an indicator. The CRC Handbook of Chemistry and Physics 67$^{th}$ Ed., CRC Press, 1986-1987, p. D-147 (ISBN-0-8493-0467-9), reports that this indicator changes colour in the pH range of 3.0 to 5.0. Alternatively, such titration can be executed aided by a pH meter to a pH endpoint in this range.

The term "stabilized metal ammine complexes" refers to metal ammine complexes in solution with sufficient ammonium sulphate to minimize precipitation of the metal as metal hydroxide.

The term "nuclei" refers to fine metal particles precipitated and/or grown from solution in the substantial absence of added metal powder.

The terms "seed material" or "metal powder seed material" refer to fine metal particles, including preformed nuclei, of the elemental metal to be recovered, which are present in a slurry which is being treated and which provide surfaces onto which precipitating metal is deposited, even under conditions at which nuclei do not form readily.

The terms "reduction" or "reducing" refer to the overall operation in which elemental metal is obtained from a solution containing the dissolved metal.

The term "nucleation" refers to the initiation of reduction to, and formation of, nuclei.

The terms "precipitation" or "precipitate", when used with reference to metal reduction, refer to the stage in reduction when metal is depositing onto nuclei or onto seed material under conditions at which nuclei may or may not readily form, usually resulting in particles of greater apparent density than the original nuclei or seed material.

The term "densification" refers to reduction in the presence of seed material under conditions at which nucleation is unlikely, whereby precipitated metal particles are obtained which have a greater apparent density than can be obtained under nucleation conditions. In the process described herein, the reduction takes place in one or more cycles, termed densification cycles.

DETAILED DESCRIPTION OF THE INVENTION

Prior to this invention, there was no clear understanding of the causes of silicon contamination in the metal powder produced by hydrogen reduction of metal diammine sulphate solution, nor an understanding of how to decrease the extent of the contamination. Thus, when the metal reduction process was practised as described above on nickel sulphate feed solutions containing high silicon concentrations, a large amount of the undesired silicon impurity in the nickel sulphate feed solution reported to the product nickel powder, and at amounts that were well above standards set for nickel powder products.

Figure 1:
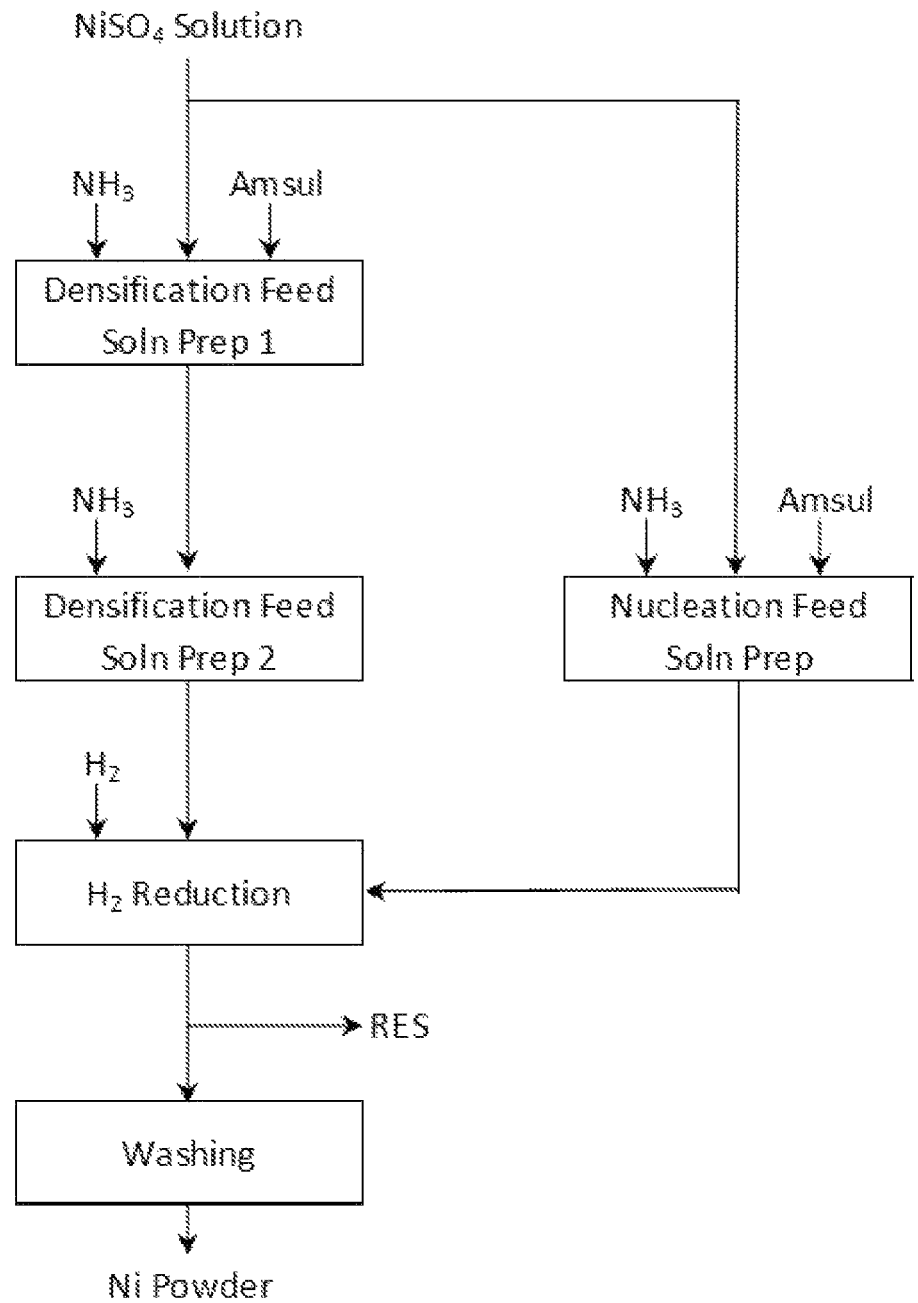
FIG. 1 is a flow diagram showing a typical nickel sulphate solution reduction process used in the industry, in order to provide a contrast for the process of the present invention.

The present application includes experimental study of the Applicant's prior industrial process, as shown in FIG. 1, with high silicon nickel sulphate feed solutions, and adjustments to the process to gain an understanding of the behaviour of the silicon impurity in both the nucleation step to generate seed material (nucleation feed) and in the preparation of the densification feed for the hydrogen reduction process.

Silicon is found to be precipitated during solution adjustment with ammonia prior to reduction, and/or during reduction of the solution with hydrogen, and to report to the nickel powder. Depending on the silicon concentration in the starting solution, the silicon content of the nickel powder product may exceed 0.02 wt %, which is significantly higher than the 0.005 wt % specification limit for this product. The silicon contamination is largely present within the nickel powder particles, rather than as a distinct phase, and cannot be easily removed from the nickel powder, e.g., by washing or leaching.

In the process as practised prior to this invention, a nucleation feed solution is prepared by adding ammonia to a low Amsul nickel sulphate solution, as shown in FIG. 1 (see the right hand side of the figure). During this step of the process, nickel hydroxide is formed in large quantity, resulting in essentially complete precipitation of silicon, thus deporting to the fine nickel powder seed material produced following introduction of hydrogen. The silicon content of the nickel powder seed material can reach 0.1%. The inventor's experimental studies have shown that this is the primary source of silicon contamination in the final nickel powder product that results following the densification cycles.

Still referring to FIG. 1, a densification feed solution is typically prepared by adding 80% to 90% of the target ammonia and 100% of the target ammonium sulphate to the nickel sulphate solution in a first preparation step, shown in FIG. 1 as Densification Feed Solution Preparation Stage 1, followed by ammonia adjustment in a second preparation step, shown as Densification Feed Solution Preparation Stage 2, to reach 100% of the target ammonia addition. In light of the inventor's experimental studies, it is now understood that, due to the low target ammonia to metals molar ratio (MR) in the Preparation Stage 1, and due to process control fluctuation which may make the tank MR up to 20% lower than the target from time to time, this process generates nickel hydroxide precipitate in the prepared solution. The inventor's studies further demonstrated that the nickel hydroxide formed in this way also co-precipitates with and/or adsorbs silicon from the solution. With extended contact of the nickel hydroxide particles with the solution prior to reduction, e.g., during an interruption in plant operation, silicon concentrations in the nickel hydroxide particles can reach as high as about 10 wt %. The formed nickel hydroxide does not re-dissolve when ammonia is added in the second solution preparation step and the silicon-containing nickel hydroxide particles are carried forward into the hydrogen reduction autoclave, resulting in a high silicon content of the finished nickel powder during the subsequent densification cycles. This is the secondary source of silicon contamination in the final nickel powder product.

The normal operating temperature for hydrogen reduction is in the range of 180 to 200° C. Nickel hydroxide formation is promoted at this high temperature unless all of the nickel is in diammine form and enough Amsul is present to stabilize the solution against hydroxide precipitate formation, which industrial practice has taught to typically correspond to about 350 g/L. If the above two parameters are not controlled well, nickel hydroxide may be formed during the densification cycles, which can also cause silicon contamination of the final nickel powder product.

Turning to FIGS. 2 to 7, exemplary embodiments of the process of the invention are shown in flow diagrams, as demonstrated with nickel sulphate feed solutions, but also applicable to cobalt or copper sulphate feed solutions, are shown. In the description that follows, the sequence of steps is generally set out in the order shown in the Figures. However, it should be understood that, where steps are shown in the flow diagrams as boxes with another box, this indicates that the sequence of the steps within the outer box may be performed in either order.

Figure 2:
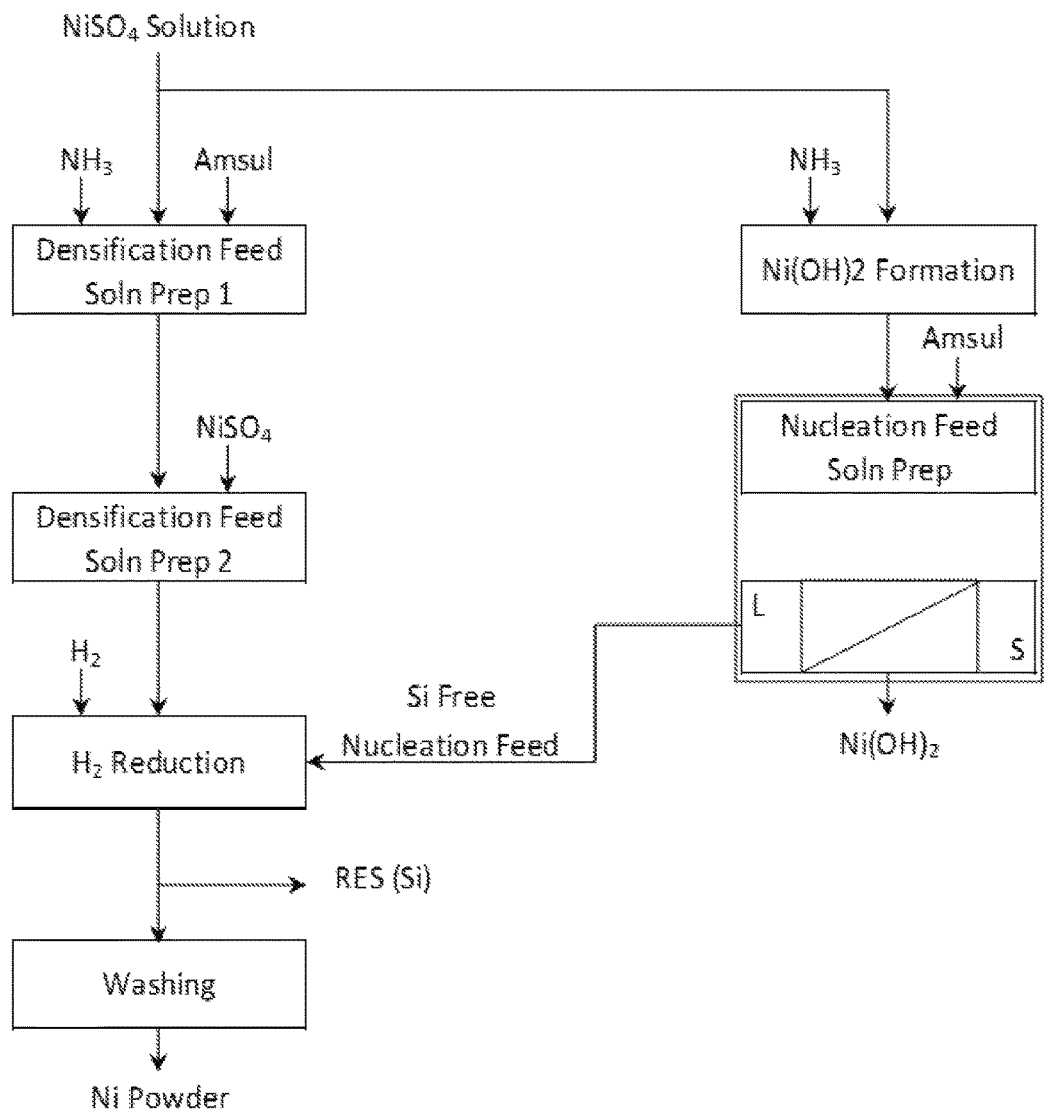
FIGS. 2 to 7 are flow diagrams showing nickel sulphate solution reduction according to exemplary embodiments of the process of the present invention, and in which boxes shown within an outer box indicates that the steps within the outer box may be performed in either order.
Figure 3:
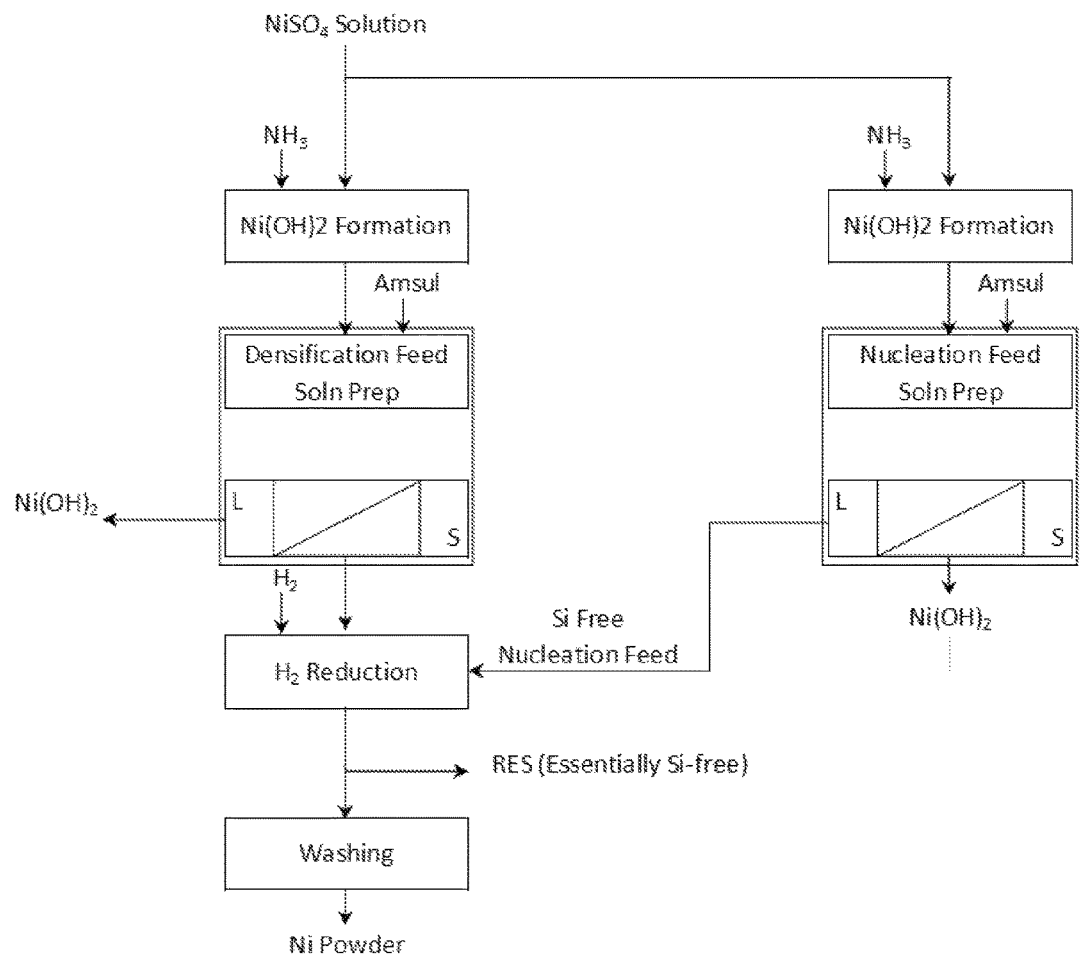
Figure 4:
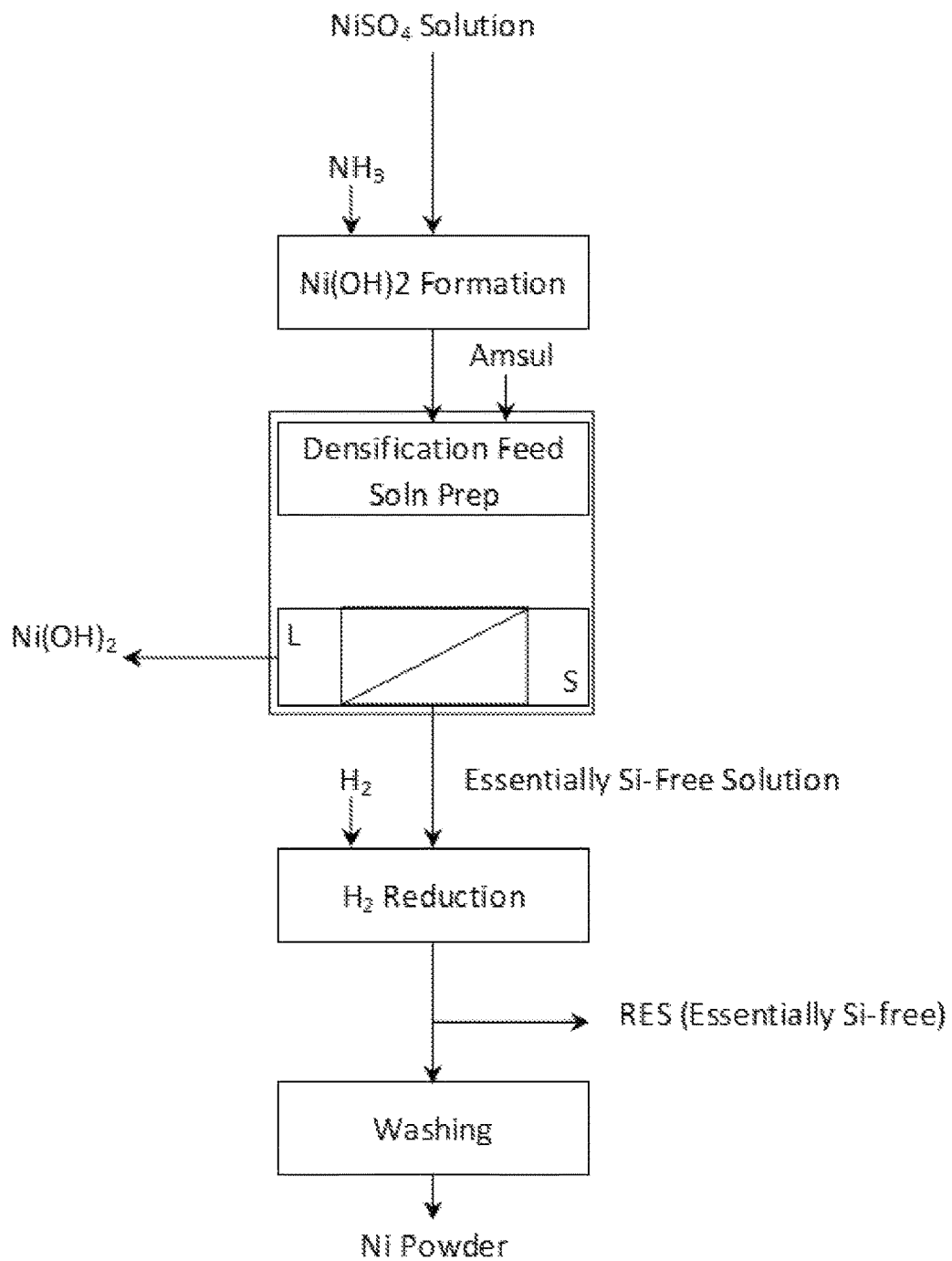
Figure 5:
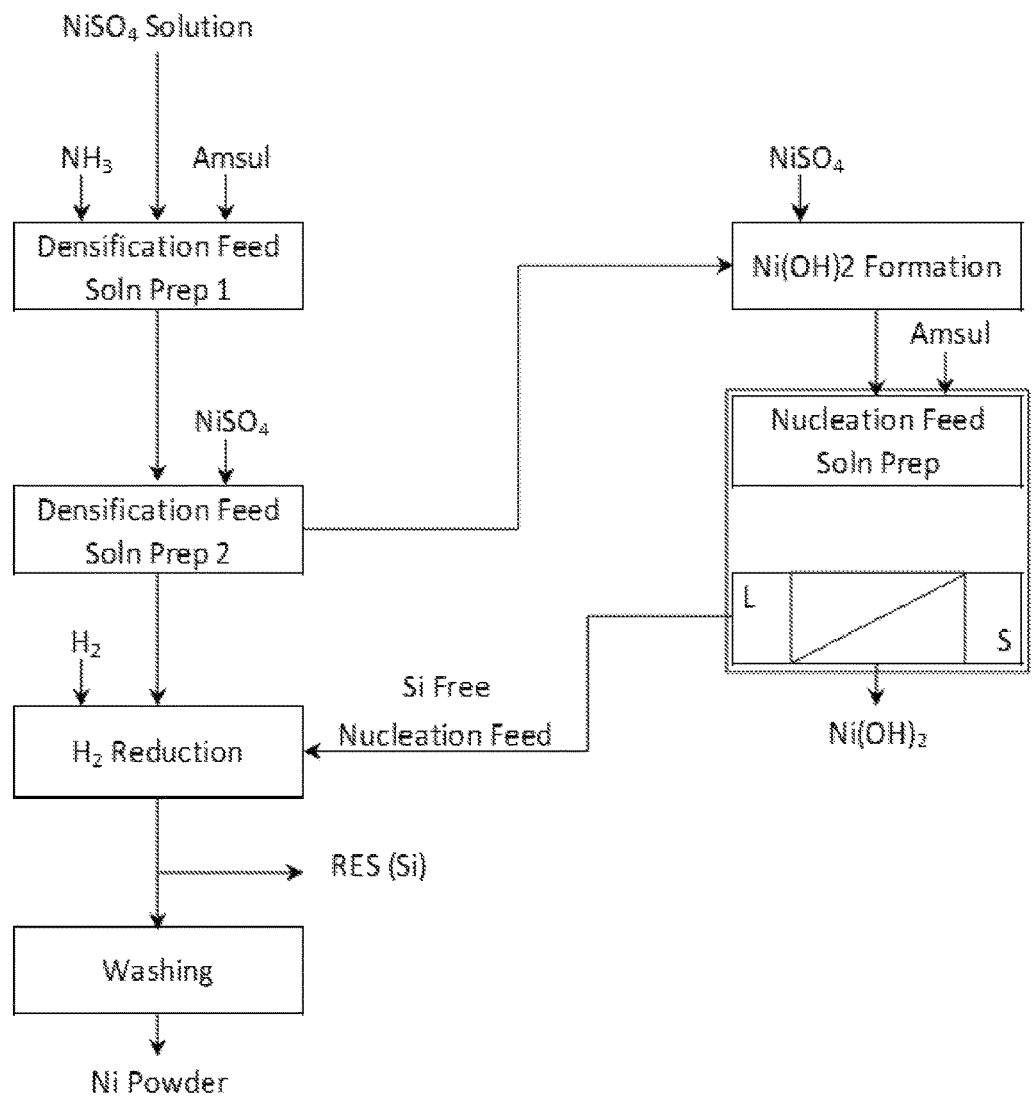
Figure 6:
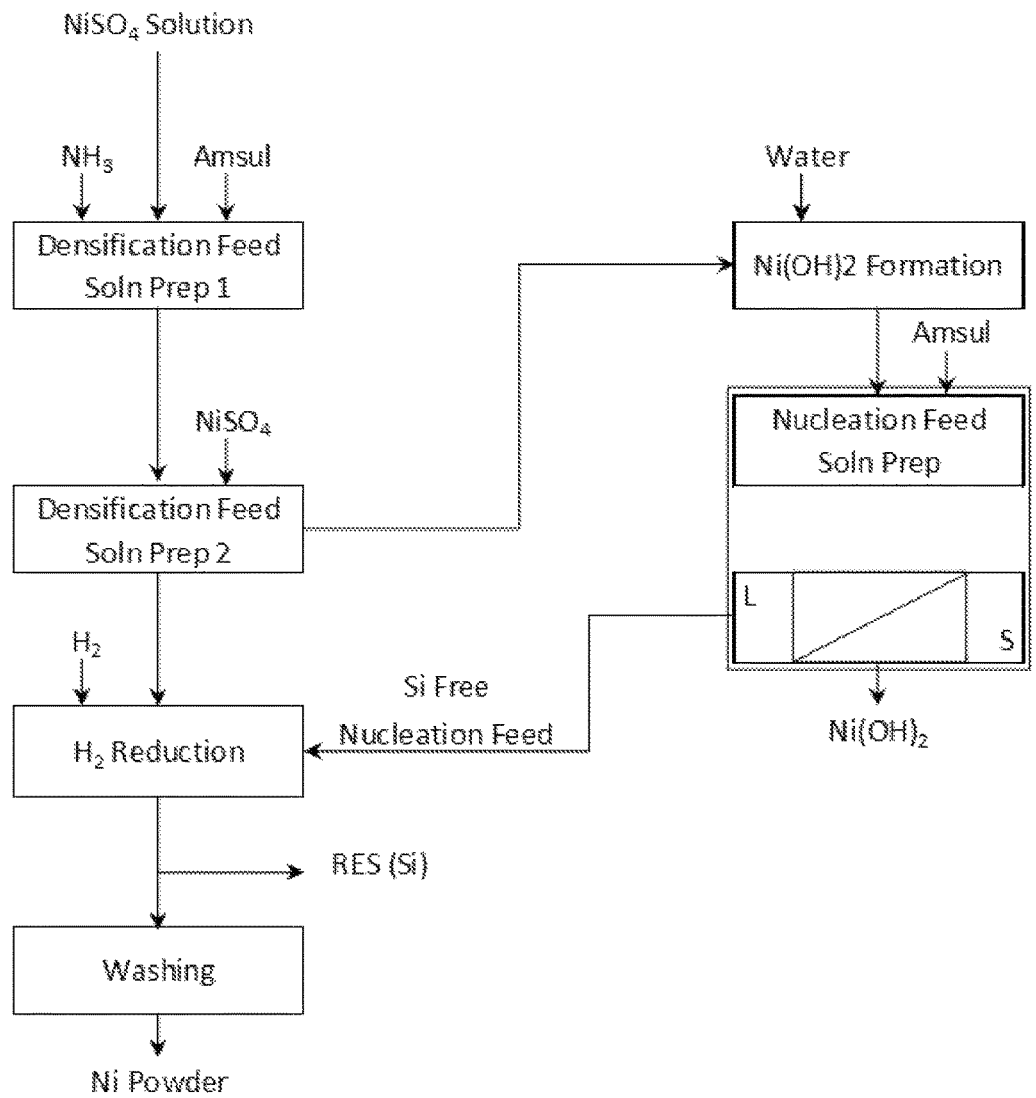
Figure 7:
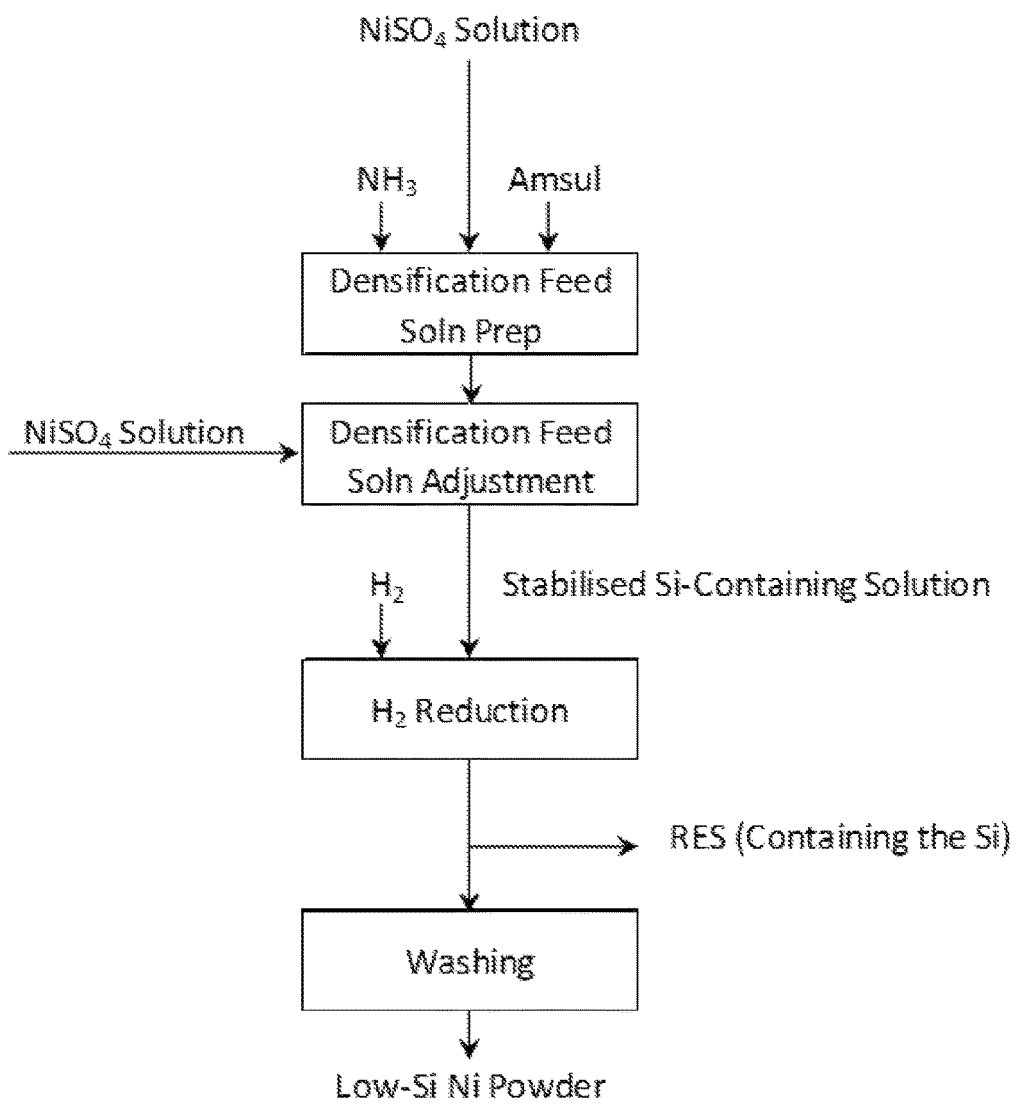

FIG. 2 shows a process for generating low silicon or silicon-free solutions for a nucleation step, as shown in the right hand side of FIG. 2. Ammonia is introduced to a low Amsul nickel sulphate solution, or a low Amsul solution is prepared by addition of Amsul to a nickel sulphate solution. In general, low Amsul solutions have Amsul concentrations of about 0-100 g/L. This addition of ammonia to a low Amsul nickel sulphate solution produces a small amount of nickel hydroxide precipitate, along with co-precipitated and/or adsorbed silicon. The formed nickel hydroxide solids are allowed to contact the solution for sufficient time to collect silicon and is then allowed to settle. The solution is either decanted or filtered to remove the silicon-bearing nickel hydroxide particles. The solution, in which silicon content has decreased or which is silicon-free, is then ready for production of low silicon or silicon-free nickel powder seed particles.

In general, a small amount of nickel hydroxide is precipitated to remove silicon by adding ammonia to the nickel sulphate solution at 20 to 100° C. (for example 50 to 90° C., or 70 to 80° C.) and atmospheric pressure. The nickel sulphate solution prepared from a sulphide intermediate, such as may be produced in a HPAL process, typically contains 30 to 100 g/L Ni (for example, 80 to 100 g/L) and about 0 to 100 g/L ammonium sulphate (for example, 50 g/L). After nickel hydroxide precipitation, ammonium sulphate is then added to between 50 to 250 g/L (typically 150 to 250 g/L) followed by liquid-solid separation. An amount of ammonium sulphate sufficient to raise the total ammonium sulphate concentration to 250 to 350 g/L is used in some embodiments. The solids removed in the liquid-solid separation step contain mainly nickel hydroxide and silicon. The resulting liquid is an aqueous solution containing very low to undetectable amounts of silicon which can then be used as a feed solution to a nucleation step (as shown in FIG. 2), or directly as a densification feed for the hydrogen reduction step in one or more densification cycles, with a reducing gas such as hydrogen at elevated temperature and pressure (see FIGS. 3 and 4, left side of the flow diagrams).

Thus, in some embodiments, the process involves production of metal hydroxide free densification feed solution, to prevent or lessen silicon collection by hydroxide precipitates which may cause secondary silicon contamination in the metal powder product. As above, while the process is demonstrated herein with the metal (Me) being nickel, the process has broader application wherein the metal is cobalt or copper.

Metal hydroxide formation is found to result from adding ammonia directly into the metal sulphate solution, for example, adding ammonia into a nickel sulphate solution with an ammonia to metals MR less than 2. The "unprotected" $Me^{2+}$ ions react with hydroxide ions provided by ammonia to form nickel hydroxide. In the case of nickel:

$$Ni^{2+}+2NH_4OH=Ni(OH)_2+2NH_4^+ \qquad (1)$$

In the industrial process as generally shown in FIG. 1, the ammonia to metals MR target is 1.8 in solution preparation stage 1.

However, the inventor discovered that unprotected metal ions exist in this solution and form metal hydroxide solids. Therefore, in some embodiments of the process, the target MR is 2 or more, such as between 2.2 and 3, in solution preparation stage 1 (see FIG. 2, left side and FIG. 7). The chemistry is then changed from adding ammonia into metal sulphate solution to adding metal sulphate feed solution into a metal diammine solution that also contains some excess ammine, in the form of triammine and/or tetrammine. The reaction can be written as shown below for nickel:

$$Ni^{2+}+10Ni(NH_3)_{2.2}^{2+}=11Ni(NH_3)_2^{2+} \qquad (2)$$

$$or\ Ni^{2+}+Ni(NH_3)_4^{2+}=2Ni(NH_3)_2^{2+} \qquad (3)$$

Ammonia is continuously added into Solution Preparation Stage 1 to generate more triammine or tetrammine to keep the MR above 2.

In general, for this step of the process, metal ammine complexes of the formula $Me(NH_3)x$ are formed in the adjusted ammoniacal ammonium sulphate solution such that x is at least the stoichiometric minimum of 2, but preferably a higher value, such as greater than 2, for example 2.2, 3 or 4, or between about 2.2 and 3.

Overly adjusted densification feed solution (i.e., having a molar ratio (MR) of $NH_3$:Me, MR>2) from the Solution Preparation Stage 1 tank (see FIG. 2) is adjusted back to a minimum of MR=1.8, or more preferably MR=2, as required, by adding the metal sulphate feed solution in the Solution Preparation Stage 2 tank (see FIG. 2). This produces an ammoniacal ammonium sulphate solution containing the metal diammine (and triammine etc.) complexes free of metal hydroxide, and with the desired ammonia to metals molar ratio for densification, while avoiding transition of the solution in a region with MR less than 1.8, preferably not less than 2, where metal hydroxide can precipitate. Without metal hydroxide formation, silicon is found to stay in solution, either as a true solution or as a colloidal suspension, throughout the subsequent hydrogen reduction process, and reports to the reduction end solution (RES), which is sent to the following circuit.

In the previous industrial process (FIG. 1), nickel diammine sulphate, $Ni(NH_3)_2SO_4$, is a suitable feed for nickel hydrogen reduction, as shown in the following chemical reaction:

$$Ni(NH_3)_2SO_4+H_2=Ni^0+(NH_4)_2SO_4 \qquad (4)$$

Nickel diammine sulphate solution is produced by adding ammonia to nickel sulphate solution in the presence of ammonium sulphate. When the ammonia to metals MR is significantly less than 2, such as at less than about 1.8, nickel ions tend to form nickel hydroxide, $Ni(OH)_2$, with the hydroxide ions provided by aqueous ammonia.

$$NH_3+H_2O=NH_4^++OH^- \qquad (5)$$

$$Ni^{2+}+2OH^-=Ni(OH)_2 \qquad (6)$$

It is now found that, even when the ammonia to metals MR is equal to 2, nickel hydroxide or basic nickel sulphate, $NiSO_4 \cdot Ni(OH)_2$, precipitates can still be formed from the nickel diammine sulphate solution when the ammonium sulphate (Amsul) concentration in the solution is deficient, according to the following chemical reactions. Sufficient Amsul can push the following two reactions to the left hand side, therefore preventing nickel hydroxide formation, as shown below in Example 1.

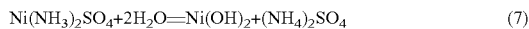

$$Ni(NH_3)_2SO_4+2H_2O=Ni(OH)_2+(NH_4)_2SO_4 \quad (7)$$

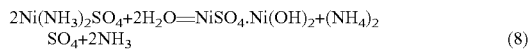

$$2Ni(NH_3)_2SO_4+2H_2O=NiSO_4.Ni(OH)_2+(NH_4)_2SO_4+2NH_3 \quad (8)$$

The reduction precipitation of the metal from solution is performed at elevated temperatures and pressures, at conditions known in the art. For example, pressures between about 2000 and 3500 kPa may be used, more generally between 700 and up to 7000 kPa. Temperatures are typically between 150 and 200° C., and more generally between 100 and up to about 260° C. It is considered good practice to bring the solution up to the desired temperature as rapidly as possible, and to limit the reduction time, for example to 15 minutes or less, as it has been found that extended residence times increase the risk of the formation of oxidic and/or hydroxidic precipitates, which carry over contamination to the metal powder precipitated by the reduction. The reducing gas is generally hydrogen. It will be understood that the reducing gas such as hydrogen may contain small amounts of inert, non-sulphidizing gases.

As a first step in the metal powder production, it is customary to generate a finely divided metal powder, which subsequently acts as a seed material, for the following reduction in one or more densification cycles, in which the powder particle size is caused to increase and the powder bulk density increases as well. One way to generate this seed material is to cause the precipitation of a small portion of the metal in solution as the hydroxide, by means of ammonia addition. The portion precipitated as the metal hydroxide is a minor portion, that is less than about 50 wt % of the metal in the feed, and is more typically in the range of 10 to 15 wt % of the metal in the feed. The fine hydroxide solids suspension is then subjected to reduction so as to be metallized. However, this method of producing the seed material inherently co-precipitates silicon that may be in solution, as disclosed above. Thus, in accordance with some embodiments, the process includes producing feed material for a nucleation step in order to produce a low silicon or silicon-free seed material. The process includes inducing the precipitation and removal of a first fraction of metal hydroxide to act as a scavenger to substantially remove the silicon impurity with the metal hydroxide in a liquid-solid separation step, as described above. The resulting solution is then reduced to form the desired seed material for the one or more densification cycles. Prior to the reducing step, but after the liquid-solid separation step, additional ammonia may be added to precipitate metal remaining in solution as a further metal hydroxide precipitate. This can assist in producing a fine metal powder seed material.

Subsequent batches of the metal sulphate solution, referred to as densification feed solution, are stabilised so as to safeguard against the potential formation of hydroxide precipitate before or during reduction, as described above.

Based on the equations set out above, and the inventor's above-noted discoveries regarding the ability to control the precipitation of nickel hydroxide in a manner to use nickel hydroxide precipitate as a scavenger for silicon impurity and/or to control the stability of the ammoniacal ammonium sulphate solutions to avoid nickel hydroxide formation in a manner to reduce silicon impurity in the nickel powder produced in subsequent nickel powder densification cycles, it will be apparent to persons skilled in the art that, not only do the processes of the invention extend to other metals including Co and Cu, due to similarities in chemistry to Ni, but that processes in accordance with the invention may be practised in many different embodiments, with the flow diagrams of FIGS. 2-7 being exemplary.

The following non-limiting examples are provided to illustrate exemplary features, conditions and embodiments of the processes of the present invention.

Example 1: Effect of Amsul Concentration on Nickel Hydroxide Formation

As noted above, sufficient Amsul can push the two reactions identified as (7) and (8) to the left hand side, therefore preventing nickel hydroxide formation. The following test was conducted to show the effect of ammonium sulphate concentration on nickel hydroxide formation. In the test, various amounts of ammonium sulphate were added to multiple beakers containing 100 mL of nickel sulphate solution which already contained about 50 g/L Amsul, followed by ammonia addition to adjust the ammonia to metals molar ratio to 2.0. The starting nickel sulphate solution also contained 51.3 g/L Ni and 0.104 g/L Si. The materials were mixed at 80° C. for 10 minutes and then filtered hot. The filtrate was kept in a hot water bath at 70° C. for 20 minutes after hot filtration, for observation of secondary precipitation. The filtered solids were washed and photographed prior to chemical analysis.

A significant amount of nickel hydroxide precipitate (green solid) was formed at 50 g/L ammonium sulphate during initial mixing of the test materials (primary precipitation). A small amount of nickel hydroxide was also observed in the 150 g/L ammonium sulphate sample. No green nickel hydroxide precipitate was observed in the other samples, with 250 to 550 g/L Amsul.

After the filtrate was cooled to room temperature and left overnight, secondary precipitation was observed. The samples were re-filtered and the collected precipitates were photographed and analysed. Green nickel hydroxide precipitate was formed at Amsul concentrations of 250 g/L or lower. The green nickel hydroxide precipitate could not be dissolved by reheating or dilution. The blue double salt ($NiSO_4.(NH_4)_2SO_4.6H_2O$) was precipitated upon cooling at Amsul concentrations of 350 g/L or higher. It contained little or no silicon. In contrast with the earlier mentioned nickel hydroxide, the double salt could be re-dissolved in the nickel sulphate solution upon reheating to 70° C. The results of chemical analysis of the precipitated solids from the test are summarized in Table 1. The green nickel hydroxide precipitates contained more silicon than the other solids in general. Due to the significant amount of nickel hydroxide precipitation at 50 g/L Amsul, the silicon concentration in the solution was drastically reduced for that sample, to 0.002 g/L.

The above results support a first important discovery for the processes described above, that is, a silicon-free or low-silicon feed solution for a nucleation step or for densification cycles is produced by precipitating a small quantity of metal hydroxide from a metal sulphate solution at relatively low Amsul concentration (for example, 0-100 g/L, such as 50 g/L, which is a typical initial concentration of Amsul in a nickel sulphate feed originating from a HPAL process). The metal hydroxide which is precipitated is found to scavenge silicon from the solution. After silicon in the solution is collected by the metal hydroxide, essentially silicon-free metal sulphate solution is obtained by decantation or filtration, which separates silicon-bearing metal hydroxide solid particles from the solution.

TABLE 1

Silicon in products at MR 2 (NH₃:Ni), varying Amsul concentration

| Amsul, g/L | Ni(OH)$_2$ in Primary Ppte | Si in Primary Ppte, wt % | Ni(OH)$_2$ in Secondary Ppte | Si in Secondary Ppte, wt % | Si in Sol'n, g/L |
|---|---|---|---|---|---|
| 50 (Feed) | Yes | 0.353 | Yes | <0.001 | 0.002 |
| 150 | Yes | 0.045 | Yes | 0.065 | 0.017 |
| 250 | No | <0.001 | Yes | 0.234 | 0.045 |
| 350 | No | <0.001 | Double salts | <0.001 | 0.05 |
| 450 | No | <0.001 | Double salts | <0.001 | 0.051 |
| 550 | No | <0.001 | Double salts | <0.001 | 0.047 |

Example 2: Scavenging Silicon with Nickel Hydroxide from Silicon-Bearing Solution One gram of nickel hydroxide (containing 0.35% Si) collected from the primary precipitation step with 50 g/L Amsul (see Example 1) was added to a nickel sulphate solution containing 350 g/L Amsul, 43.5 g/L Ni and 0.064 g/L Si, with an ammonia to metals MR of 2.0 and the combined slurry was mixed at 80° C. for 4 hours. The slurry was hot filtered and 0.61 g containing 0.91 wt % Si of a gel-like green residue was collected. The total mass of nickel hydroxide added was thus reduced by 39%, but the silicon content in the nickel hydroxide solids increased from 0.35 wt % to 0.91 wt %, which is far above the enrichment in silicon that would be explained by mass loss alone. In combination with Example 1, which resulted in essentially no precipitation of silicon from similar solution in the presence of 350 g/L Amsul with an ammonia to metals molar ratio of 2.0, this showed that silicon is collected by nickel hydroxide by extended contact of the nickel hydroxide with the solution.

Example 3: Effect of Ammonia to Metals Molar Ratio

This example was conducted to study the effect of ammonia to metal molar ratio (MR) on the formation of nickel hydroxide. In Test 1, various amounts of ammonia (MR 1 to 6) were added to 100 mL aliquots of nickel sulphate solution containing about 50 g/L Amsul and the mixtures were held at 80° C. for 10 minutes. The precipitated solids were photographed and analysed. Nickel hydroxide was formed under all MR conditions from 1 to 6 when the ammonium sulphate concentration was 50 g/L.

Test 2 was conducted under the same conditions as Test 1, except that an additional 300 g/L ammonium sulphate was added to the test solution, to bring the total ammonium sulphate concentration to 350 g/L. The ammonia to metals MR varied from 1 to 6 and the mixture was held at 80° C. for 10 minutes, as in Test 1.

The precipitated solids were photographed and analysed. No precipitate was formed from MR 2 to 6 when the ammonium sulphate concentration was 350 g/L. Bluish and greenish precipitates were formed at MR 1, which appeared to contain primarily double salt and some nickel hydroxide.

Table 2 shows that the silicon content of the green nickel hydroxide precipitated at 50 g/L Amsul concentration is high regardless of the MR being between 1 and 6. The lower silicon content in the MR 1 sample at 350 g/L Amsul is due to dilution of silicon-bearing nickel hydroxide with a large quantity of double salt in the solid sample.

TABLE 2

Solids Assays

| | Test 1: 50 g/L Amsul | | Test 2: 350 g/L Amsul | |
|---|---|---|---|---|
| Ammonia to metal MR | Ni(OH)$_2$ in Primary Ppte | Si in Primary Ppte, wt % | Ni(OH)$_2$ in Primary Ppte | Si in Primary Ppte, wt % |
| 1 | Yes | 0.82 | Yes* | 0.026 |
| 2 | Yes | 0.34 | No | 0.015 |
| 3 | Yes | 0.44 | No | 0.012 |
| 4 | Yes | 0.52 | No | 0.023 |
| 5 | Yes | 1.5 | No | 0.023 |
| 6 | Yes | 1.77 | No | 0.018 |

*contains minor amount of nickel hydroxide mixed with major amount of double salt

Example 4: Use of Nickel Sulphate Solution to Lower Ammonia to Metals Molar Ratio The results of the above examples show that silicon-containing nickel hydroxide is not formed at 350 g/L Amsul and an ammonia to metals MR of 2 or higher. That is, to eliminate the formation of silicon-containing nickel hydroxide, the system is maintained at an MR=2 or higher. In this example, nickel sulphate solution containing 51.3 g/L Ni and 0.104 g/L Si was added to solutions containing 43.5 g/L Ni, 0.064 g/L Si and 350 g/L Amsul that had been adjusted to an ammonia to metals MR of 3, 4, 5 or 6. The addition of ammonia-free nickel sulphate solution in each case was the quantity required to decrease the ammonia to metals MR to the target value of 2 in the mixture. The mixtures were photographed and analysed. No precipitate was formed from any of the mixtures. This presents another process choice for adjustment of the nickel diammine solution prior to hydrogen reduction, e.g., adding excess ammonia initially, to target an ammonia to metals MR of about 2.5 and an ammonium sulphate concentration of about 440 g/L, prior to nickel sulphate readjustment to provide the target values of MR=2 and 350 g/L ammonium sulphate.

The above test results support another aspect the invention, that is, production of metal hydroxide free densification feed solution to prevent silicon collection during the metal hydrogen reduction process by controlling the reagent addition sequence. Extra ammonia and ammonium sulphate are added in Densification Feed Solution Preparation 1 step, and metal sulphate solution is added to reduce the ammonia to metals MR and the ammonium sulphate concentration to the target values in the Densification Feed Solution Preparation 2 step. This process ensures that the system stays in the metal hydroxide formation free zone at all times, even if there is a process upset which temporarily causes a lower MR or a lower ammonium sulphate concentration. This practice is important, since once silicon-bearing metal hydroxide is precipitated, it does not re-dissolve in the reduction feed solution and the silicon containing solids are carried into the hydrogen reduction autoclave, resulting in a high silicon content in the metal powder that is produced during the subsequent densification steps.

Addition of further nickel sulphate solution, beyond the quantity described above, was found to lead to conditions which favoured nickel hydroxide precipitation, which in turn scavenges the silicon from solution.

Industrial Relevance

In the industrial production of nickel powder according to the process of FIG. 1 from high silicon nickel sulphate feed solution, the process was routinely producing nickel powder seed material containing up to 0.09 wt % Si and final nickel powder containing typically 0.02 wt % Si. Test work showed that processing the industrial solutions in accordance with FIG. 2, within the ranges set out above for processes of the present invention, a nickel powder seed material quality of 0.005% silicon was routinely achieved. About 0.3 to 0.8 wt % Si was analysed in the nickel hydroxide residue.

The experimental conditions set out above for the processes of the invention are exemplary only and the invention may be practised under other conditions without departing from the invention. General conditions for the nucleation step and the reduction of metal from sulphate solutions in one or more densification cycles are well known in the art, such as are described in the literature, for example in the patents mentioned above, and the process of the invention may be practised under a range of conditions such as are well known in the art.

All publications mentioned herein are indicative of the level of skill of those skilled in the art to which this invention pertains. All publications are herein incorporated by reference to the same extent as if each individual publication was specifically and individually indicated to be incorporated by reference.

The terms and expressions used in this specification are terms of description and not of limitation. There is no intention in using such terms and expression of excluding equivalents of the features shown and described, it being recognized that the scope of the invention is defined and limited only by the claims which follow.

I claim:

1. A process of treating a metal sulphate solution containing an undesired silicon impurity, wherein the metal is one of Ni, Co, or Cu, comprising:
   i) providing metal hydroxide solids in a feed of the metal sulphate solution to scavenge the undesired silicon impurity with the metal hydroxide solids; and then, in either order,
   ii) adding ammonia, ammonium sulphate and/or the metal sulphate feed solution in one or more steps with mixing, as needed, in an amount sufficient to form an ammoniacal solution of ammonium sulphate containing stabilized metal ammine complexes; and
   iii) separating the metal hydroxide solids to remove the silicon impurity with the metal hydroxide solids.

2. The process of claim 1, further comprising:
   iv) after steps ii) and iii) in either order, reacting the solution resulting from step ii) or iii) with a reducing gas at a temperature between 100 and 260° C. and a pressure between 2000 and 3500 kPa to produce a finely divided seed material of elemental metal powder.

3. The process of claim 1, further comprising:
   v) after steps ii) and iii) in either order, reacting the solution resulting from step ii) or iii) with a reducing gas at a temperature between 100 and 260° C. and a pressure between 2000 and 3500 kPa in one or more densification cycles to produce an elemental metal powder product and a reduction end solution;
   vi) separating the metal powder product from the reduction end solution; and
   vii) optionally conducting step v) in the presence of a finely divided seed material of elemental metal powder formed by, after steps ii) and iii) in either order, reacting the solution resulting from step ii) or iii) with a reducing gas at said temperature and pressure to produce a finely divided seed material of elemental metal powder.

4. The process of claim 3, wherein the metal is Ni and the reducing gas is hydrogen.

5. The process of claim 4, wherein the metal hydroxide solids in step i) are generated by adding ammonia to an aqueous nickel sulphate feed solution with mixing in an amount to precipitate nickel hydroxide to scavenge the undesired silicon impurity.

6. The process of claim 5, wherein step i) is followed by step ii) and then step iii), and wherein step ii) includes adding ammonium sulphate, as needed, in an amount sufficient to provide stabilized nickel ammine complexes of the formula $Ni(NH_3)_x^{2+}$, where x is at least 2.

7. The process of claim 6, wherein the temperature in step i) is an elevated temperature in the range of 20-100° C.

8. The process of claim 7, wherein the temperature in step i) is in the range of 50-90° C.

9. The process of claim 7, wherein the temperature in step i) is in the range of 65-90° C.

10. The process of claim 7, wherein, in step ii), the molar ratio of $NH_3$:Ni is maintained above about 2.

11. The process of claim 10, wherein, in step ii), the molar ratio of $NH_3$:Ni is maintained above about 2.2.

12. The process of claim 10, wherein, in step ii), the molar ratio of $NH_3$:Ni is maintained between about 2.2 and 3.

13. The process of claim 10, wherein the nickel sulphate feed solution contains nickel in an amount of about 30 to 100 g/L, and ammonium sulphate is added in an amount sufficient to raise the ammonium sulphate content to greater than 100 g/L.

14. The process of claim 13, wherein ammonium sulphate is added in an amount sufficient to raise the ammonium sulphate content to greater than 250 g/L.

15. The process of claim 13, wherein ammonium sulphate is added in an amount sufficient to raise the ammonium sulphate content to greater than 300 g/L.

16. The process of claim 13, wherein ammonium sulphate is added in an amount sufficient to raise the ammonium sulphate content to greater than 350 g/L.

17. A process for recovering metal powder from a metal sulphate solution containing undesirable silicon impurity, wherein the metal (Me) is one of Ni, Co or Cu, the process comprising:
   a) pretreating a portion of the metal sulphate solution with ammonium sulphate and ammonia with mixing to form an ammoniacal solution of ammonium sulphate in which a molar ratio of $NH_3$:Me is at least the stoichiometric value to provide stabilized metal ammine complexes of the formula $Me(NH_3)x$, wherein x is at least 2;
   b) adding a feed of the metal sulphate solution to the ammoniacal solution of ammonium sulphate of step a) with mixing without allowing the molar ratio of $NH_3$:Me to drop below about 1.8 to form an adjusted solution;
   c) reacting the adjusted solution of step b) with a reducing gas at a temperature between 100 and 260° C. and a pressure between 2000 and 3500 kPa in one or more densification cycles to produce an elemental metal powder product and a reduction end solution containing the undesired silicon impurity; and
   d) separating the metal powder product from the reduction end solution.

18. The process of claim 17, wherein the metal is Ni and the reducing gas is hydrogen.

19. The process of claim 17, further comprising preparing a seed material for step c), comprising:
   i) adding ammonia to the metal sulphate solution with mixing in an amount sufficient to precipitate metal hydroxide solids to scavenge the undesired silicon impurity from the metal sulphate solution; and then, in either order,
ii) adding ammonium sulphate, as needed, in an amount sufficient to form an ammoniacal solution of ammonium sulphate containing stabilized metal ammine complexes of the formula Me(NH$_3$)x, where x is at least 2; and
iii) separating the metal hydroxide solids to remove the silicon impurity with the metal hydroxide solids; and
iv) after step ii) and iii) in either order, reacting the solution resulting from step ii) or iii) with a reducing gas at a temperature between 100 and 260° C. and a pressure between 2000 and 3500 kPa to produce a finely divided seed material of elemental metal powder onto which the elemental metal powder product is formed in the one or more densification cycles of step c).

20. The process of claim 19, wherein steps c) and iv) are performed in an autoclave, with step iv) producing the seed material of the elemental metal powder in the autoclave followed by the one or more densification cycles of step c).

21. The process of claim 20, wherein the metal is Ni, the reducing gas is hydrogen, and the metal sulphate solution in steps a) and b) is aqueous.

22. The process of claim 21, wherein the nickel sulphate solution contains nickel in an amount of about 30 to 100 g/L, and ammonium sulphate is added in an amount sufficient to raise the ammonium sulphate content to greater than 100 g/L.

23. The process of claim 22, wherein ammonium sulphate is added in an amount sufficient to raise the ammonium sulphate content to greater than 250 g/L.

24. The process of claim 22, wherein ammonium sulphate is added in an amount sufficient to raise the ammonium sulphate content to greater than 300 g/L.

25. The process of claim 22, wherein ammonium sulphate is added in an amount sufficient to raise the ammonium sulphate content to greater than 350 g/L.

26. The process of claim 21, wherein the temperature in steps a), b), and i) is an elevated temperature in the range of 20-100° C.

27. The process of claim 26, wherein the temperature in steps a), b), and i) is in the range of 50-90° C.

28. The process of claim 26, wherein the temperature in steps a), b), and i) is in the range of 65-90° C.

29. The process of claim 26, wherein, in step a), the ammonium sulphate is added before the ammonia to avoid forming a nickel hydroxide precipitate.

30. The process of claim 29, wherein steps a), b), c) and d) are conducted in separate vessels.

31. The process of claim 29, wherein, in steps a) and b), the molar ratio of NH$_3$:Ni is maintained above about 2.

32. The process of claim 29, wherein the molar ratio of NH$_3$:Ni in step a) is maintained between about 2.2 and 3.

33. The process of claim 29, wherein in step ii), the molar ratio of NH$_3$:Ni is maintained above about 2.

34. The process of claim 33, wherein in step ii), the molar ratio of NH$_3$:Ni is maintained above about 2.2.

35. The process of claim 33, wherein in step ii), the molar ratio of NH$_3$:Ni is maintained between about 2.2 and 3.

36. The process of claim 17, which further comprises:
i) diluting the adjusted solution of step b) with one or both of water and the metal sulphate solution with mixing in an amount sufficient to precipitate metal hydroxide solids to scavenge the undesired silicon impurity from the metal sulphate solution; and, in either order,
ii) adjusting with ammonium sulphate, as needed, in an amount sufficient to form an ammoniacal solution of ammonium sulphate containing stabilized metal ammine complexes of the formula Me(NH$_3$)x, where x is at least 2; and
iii) separating the metal hydroxide solids to remove the silicon impurity with the metal hydroxide solids; and
iv) after step ii) and iii) in either order, reacting the solution resulting from step ii) or iii) with a reducing gas at a temperature between 100 and 260° C. and a pressure between 2000 and 3500 kPa to produce a finely divided seed material of elemental metal powder onto which the elemental metal powder product is formed in the one or more densification cycles of step c).

37. The process of claim 36, wherein the metal is Ni and the reducing gas is hydrogen.

38. The process of claim 17, which further comprises:
i) diluting the adjusted solution of step b) with one or both of water and the metal sulphate solution with mixing in an amount sufficient to precipitate metal hydroxide solids to scavenge the undesired silicon impurity from the metal sulphate solution; and, in either order,
ii) adjusting with ammonium sulphate, as needed, in an amount sufficient to form an ammoniacal solution of ammonium sulphate containing stabilized metal ammine complexes of the formula Me(NH$_3$)x, where x is at least 2; and
iii) separating the metal hydroxide solids to remove the silicon impurity with the metal hydroxide solids; and
iv) after step ii) and iii) in either order, reacting the solution resulting from step ii) or iii) with a reducing gas at a temperature between 100 and 260° C. and a pressure between 2000 and 3500 kPa to produce a finely divided seed material of elemental metal powder onto which the elemental metal powder product is formed in the one or more densification cycles of step c).

39. The process of claim 38, wherein the metal is Ni and the reducing gas is hydrogen.

\* \* \* \* \*